United States Patent [19]

Saka

[11] 4,379,557

[45] Apr. 12, 1983

[54] VALVE STEM PACKING STRUCTURE

[75] Inventor: Hamid J. Saka, Houston, Tex.

[73] Assignee: ACF Industries, Incorporated, New York, N.Y.

[21] Appl. No.: 240,700

[22] Filed: Mar. 5, 1981

[51] Int. Cl.³ .......................... F16J 15/18; F16J 15/40
[52] U.S. Cl. ..................................... 277/59; 277/229; 277/DIG. 6; 137/72; 251/214
[58] Field of Search ................. 277/230, 229, DIG. 6, 277/72 FM, 59, 58; 137/72, 74; 251/174, 214

[56] References Cited

U.S. PATENT DOCUMENTS

| | | | |
|---|---|---|---|
| 2,647,721 | 8/1953 | Volpin | 251/103 |
| 2,883,214 | 4/1959 | Perlaki | 286/19 |
| 3,096,070 | 7/1963 | Wolfensperger | 251/214 |
| 3,177,887 | 4/1965 | Priese | 137/74 |
| 3,630,483 | 12/1971 | Canalizo | 251/174 |
| 3,788,600 | 1/1974 | Allen | 251/214 |
| 3,907,307 | 9/1975 | Maurer et al. | 277/69 |
| 3,990,465 | 11/1976 | Allen | 137/72 |
| 4,006,881 | 2/1977 | Gaillard | 251/214 |
| 4,075,114 | 2/1978 | Ishikawa et al. | 277/DIG. 6 |
| 4,082,105 | 4/1978 | Allen | 137/72 |
| 4,090,719 | 5/1978 | Simanskis et al. | 277/125 |
| 4,160,551 | 7/1979 | Nixon et al. | 277/124 |
| 4,162,078 | 7/1979 | Cox | 277/102 |
| 4,177,998 | 12/1979 | Laitkep | 277/59 |
| 4,209,177 | 6/1980 | Hall | 277/230 |
| 4,214,600 | 7/1980 | Williams, Jr. et al. | 137/72 |

Primary Examiner—Robert I. Smith
Attorney, Agent, or Firm—Marvin J. Marnock

[57] ABSTRACT

A "fire-safe" packing arrangement (104) for a valve stem (72) which extends through a packing chamber in a valve bonnet bore (42) to a valve chamber (50) in a valve body (12). The packing arrangement (104) comprises a low temperature packing assembly (112) positioned within the packing chamber between the stem (72) and the wall of the bonnet bore (42) for sealing therebetween at normal temperatures and resting on an inner annular shoulder (62) provided in the bonnet bore (42). A metal spacer ring (116) is positioned within the packing chamber axially outward of the low temperature packing assembly (112) with respect to the flow passage (18, 20) through the valve. The spacer ring (116) has a lower side or inner end (140) thereof resting on the low temperature packing assembly (112). The packing arrangement includes a high temperature packing assembly (114) positioned within the packing chamber between the stem (72) and the wall of the bonnet bore (42) and axially outward of the spacer ring (116) with respect to the flow passage (18, 20). The high temperature packing assembly (114) is sandwiched between the outer end portion (138) of the spacer ring (116) and a retainer (106) seated on an annular shoulder (58) provided in the bonnet bore (42). The high temperature packing seals between the stem (72) and the valve body (12) at above normal temperature conditions of the valve body (12) which are destructive of the low temperature packing assembly (112). The packing arrangement (104) effectively seals throughout the range of low and above normal temperatures without imposing frictional drag on the valve stem.

12 Claims, 3 Drawing Figures

VALVE STEM PACKING STRUCTURE

BACKGROUND OF THE INVENTION

The invention relates to packing structures between a shaft and a housing, and specifically to a packing structure for sealing between a valve stem and valve housing at both normal low temperature operating conditions and also at above normal high temperature conditions.

Valves utilized in pipelines that carry petroleum products are susceptible to exposure to abnormally high temperatures in the event of a fire in the pipeline. It is essential to effective operation that the valve, and in particular the seal between the valve stem and valve body, not leak under such abnormal operating conditions. Of course, the stem packing must also effectively seal at normal operating temperatures.

A variety of arrangements have been used in the past to provide for sealing between the valve stem and valve body at high temperatures. U.S. Pat. No. 3,788,600 prevents venting of the valve chamber to the atmosphere when there is an excessive pressure build-up and U.S. Pat. No. 4,082,105 provides for a secondary stem seal if the primary valve stem packing is destroyed by heat. In this arrangement, the secondary stem seat is activated at high temperatures and bites into the valve stem to impose a severe frictional drag.

Various other arrangements which have been utilized to provide high temperature sealing properties are exemplified by the following U.S. patents:

| U.S. Pat. No. | Inventor | Issue Date |
| --- | --- | --- |
| 2,647,721 | Volpin | August 4, 1953 |
| 3,177,887 | Priese | April 13, 1965 |
| 3,630,483 | Camalizo | Dec. 28, 1971 |
| 3,990,465 | Allen | Nov. 9, 1976 |
| 4,006,881 | Guillard | Feb. 8, 1977 |
| 4,090,719 | Simanskie et al | May 23, 1978 |
| 4,160,551 | Nixon et al | July 10, 1978 |
| 4,214,600 | Williams, Jr. et al | July 29, 1980 |

In addition, several U.S. patents disclose the use of two sets of packings separated by a lantern ring or the like which is exposed to an external source of fluid lubricant or other injectible substance. U.S. patents that are exemplary of this type of structure are U.S. Pat. No. 2,883,214 issued on Apr. 21, 1959 to Perlaki, U.S. Pat. No. 3,096,070 issued on July 2, 1963 to Wolfensperger, and U.S. Pat. No. 3,907,307 issued on Sept. 23, 1975 to Mauer et al.

However, the prior art does not disclose the use of a low temperature sealing assembly in combination with a high temperature sealing assembly which are separated from one another in a packing chamber by a spacer ring or the like and which together are effective in providing a seal under both relatively low temperature are high temperature conditions and without the imposition of severe frictional drag as does the valve stem packing structure of this invention.

SUMMARY OF THE INVENTION

Thus, it is an object of the invention to provide an improved "fire-safe" packing structure for a shaft or valve stem which is operative to effect a seal under low temperature and high temperature conditions without imposing a frictional drag on the shaft or stem.

It is another object of the invention to provide an improved "fire-safe" packing structure that incorporates a low temperature packing assembly for providing effective valve stem sealing at relatively normal operating temperatures and a high temperature packing assembly for providing effective valve stem sealing at abnormally high temperatures which are destructive to the low temperature packing assembly.

The invention is a so-called "fire-safe" packing arrangement for a valve stem extending through a packing chamber and bore in a valve housing provided by a bonnet assembly mounted on a valve body. The packing arrangement comprises a low temperature packing assembly and a high temperature packing assembly, both positioned within the packing chamber between the stem and valve housing for sealing therebetween at low or normal operating temperatures as well as above normal high temperatures. The low temperature packing assembly rests on an inner annular shoulder formed in the bore in the valve housing. A spacer ring is positioned within the packing chamber axially outward of the low temperature packing assembly with respect to the flow passage through the valve. The spacer ring has one side thereof resting on the low temperature packing assembly. The high temperature packing assembly is also positioned within the packing chamber between the stem and valve housing and axially outward of the spacer ring with respect to the flow passage so as to be sandwiched between the outer side of the spacer ring and an upper retainer barrier seated on a second annular shoulder in the valve housing bore. At above normal temperature conditions of the valve body which can be destructive to the low temperature packing assembly, the high temperature packing assembly provides an effective seal between the valve stem and valve body.

DETAILED DESCRIPTION OF THE INVENTION

Figure 1:
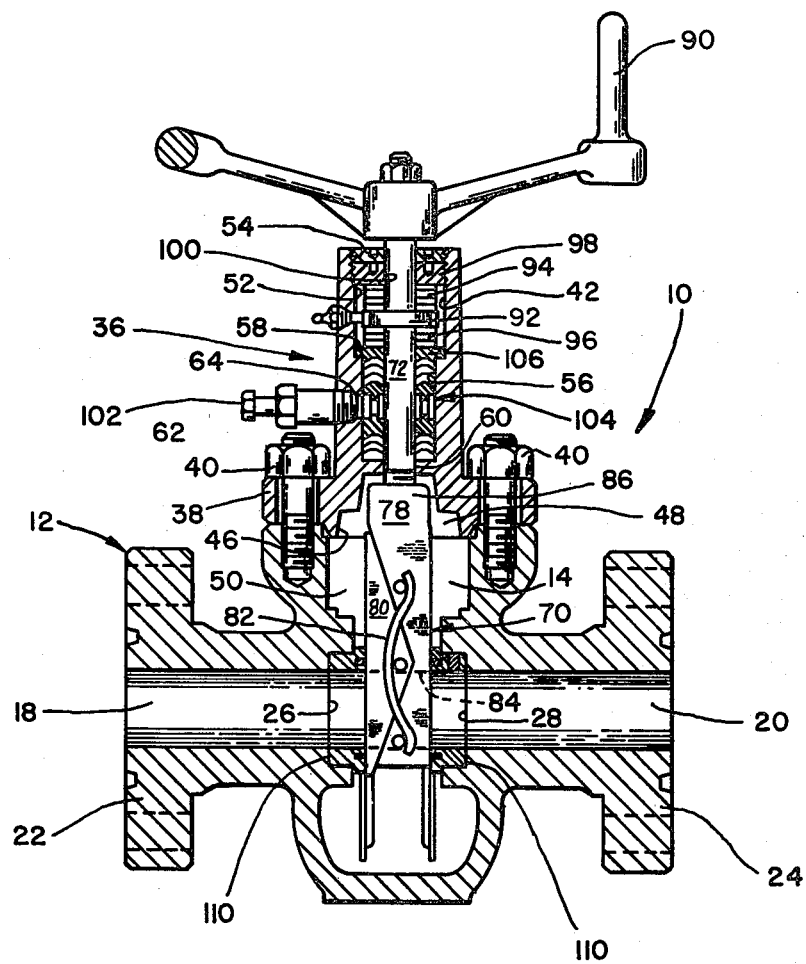
FIG. 1 is a plan view, a portion shown in section, of a non-rising stem type expanding gate valve in which the packing assembly of the invention is utilized.

Referring to FIG. 1, there is illustrated a gate valve 10 which incorporates the novel valve seat structure of this invention. The gate valve 10 includes a valve body 12 which has a body cavity 14 formed therein and inlet and outlet flow passages 18, 20 communicating with the valve body cavity 14. The valve body 12 is further provided with flanges 22 and 24 adjacent the inlet and outlet flow passages, respectively, and at the outer ends thereof to facilitate connection of the valve in a flowline.

A bonnet assembly generally designated as 36 is connected via a lower flange 38 to the valve body 12 by a plurality of bolts 40. The bonnet assembly 36 has a bore 42 formed therethrough, the lower end 46 of which is shaped to define a bonnet cavity 48. The bonnet cavity 48 together with the valve body cavity 14 define a valve chamber 50. At its upper end, bore 42 has an enlarged diameter portion 52 which is provided with internal threads 54 adjacent its upper end. The bore 42 further includes an intermediate diameter portion 56 located adjacent and axially inward of enlarged diameter bore portion 52 towards the valve chamber, thus providing the bore 42 with an annular upward facing shoulder 58. The bore 42 further includes a reduced diameter portion 60 extending from the bottom of the intermediate diameter bore portion 56 as defined by an upwardly facing annular shoulder 62 so as to communicate with the bonnet cavity 48. The bonnet assembly 36 is further provided with a threaded port 64 which extends laterally through the wall of the bonnet assembly 36 into communication with the intermediate bore portion 56. Threaded port 64 accommodates a lubricant fitting 102.

The gate valve 10 includes a gate assembly 70 positioned within the valve chamber 50 for reciprocal up and down movement between open and closed positions relative to the flow passages 18 and 20. The gate assembly 70 is moved by selective rotation of the valve stem 72 which extends from the gate assembly through the bonnet bore 42 and an opening 100 in retainer 98 which is threadedly connected in the upper end of the bore 42. For this purpose, the valve stem 72 is provided at its upper end with a handle 90 and at its lower end is threaded so as to be received within the correspondingly threaded bore which is formed in an upwardly directed extension 86 of the gate member 78. The valve stem 72 is also provided with a collar 92 which is mediately disposed between upper and lower thrust bearings 94 and 96, respectively, contained within the enlarged diameter bore portion 52. Thus, upon rotation of the valve stem, the gate assembly 70 is moved up or down relative thereto and depending on the selected direction of rotation effects an opening or closing of the gate valve 10 as is desired.

The gate assembly 70 includes, in addition to the gate member 78, a segment 80 which is disposed adjacent the inlet flow passage 18. The gate member 78 is provided with a V-shaped recess which receives the V-shaped face of the segment 80 for cooperative engagement therewith. A pair of curved springs 82, only one of which is shown, engage pins on opposite sides of the gate 78 and segment 80 in a manner to continuously urge the gate 78 and segment 80 towards one another and therefore biasing the gate assembly toward a collapsed condition. As the valve handle 90 is turned to effect a selected upward or downward movement of the gate assembly 70, upper and lower stops place a limit to the upward and downward movement of the segment. The upper stop is the inside surface of the bonnet and the lower stop is the bottom of the valve chamber. Accordingly, with continuing movement of the gate member, there is a camming action from sliding contact between the co-engaging faces of the gate and segment which results in an expanded condition of the gate assembly when in its open position as seen in FIG. 1 and a similar expanded condition when the gate assembly is disposed towards the bottom of the valve chamber in the closed position. As is conventional, there is an opening 84 in the gate assembly formed by ports in the gate 78 and segment 80 which are in alignment with each other and the flow passages 18, 20 when the valve is in the open position.

In addition, it is also to be noted the outwardly facing sides of the gate and segment are planar surfaces which continually remain parallel to one another and perpendicular to the flow passages for all positions of the gate assembly. In the open and closed positions of the valve, with the gate assembly in its expanded condition, these planar surfaces of the gate and segment are disposed in sealing engagement with valve seats 110, one of which is located in each annular seat pocket 26, 28 formed about the inlet and outlet flow passages through the valve and opening to the valve body cavity. A form of valve seat structure considered most suitable for use with the gate valve 10 which incorporates the novel packing structure of this invention, is the subject of a patent application filed concurrently herewith and also assigned to ACF Industries, Incorporated.

A "fire-safe" stem packing arrangement generally designated 104 and representing a preferred embodiment of the invention is positioned within intermediate diameter bore portion 56 so as to be sandwiched between an upper barrier comprised of a packing retainer 106, which is seated on the bore shoulder 58, and a lower barrier provided by the annular shoulder 62.

Figure 2:
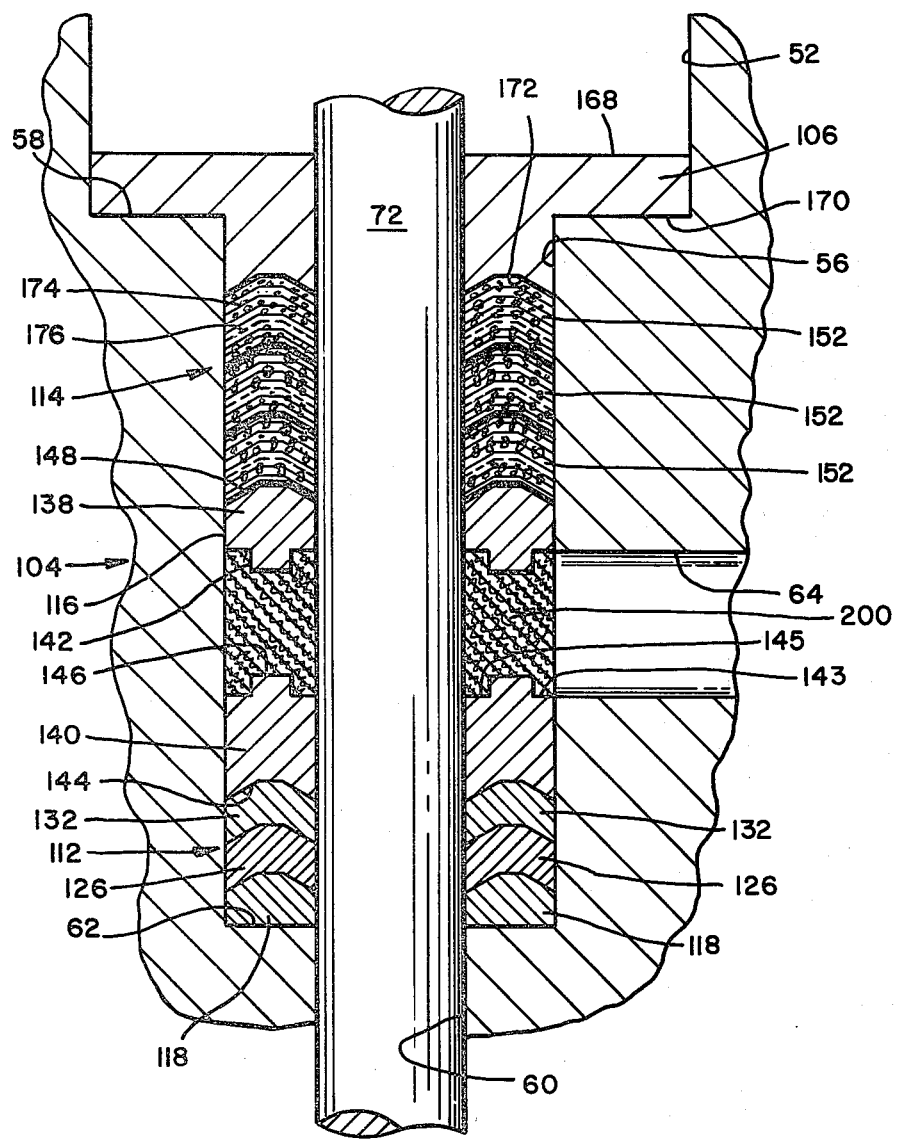
FIG. 2 is a plan view of the packing arrangement used with the gate valve illustrated in FIG. 1.
Figure 3:
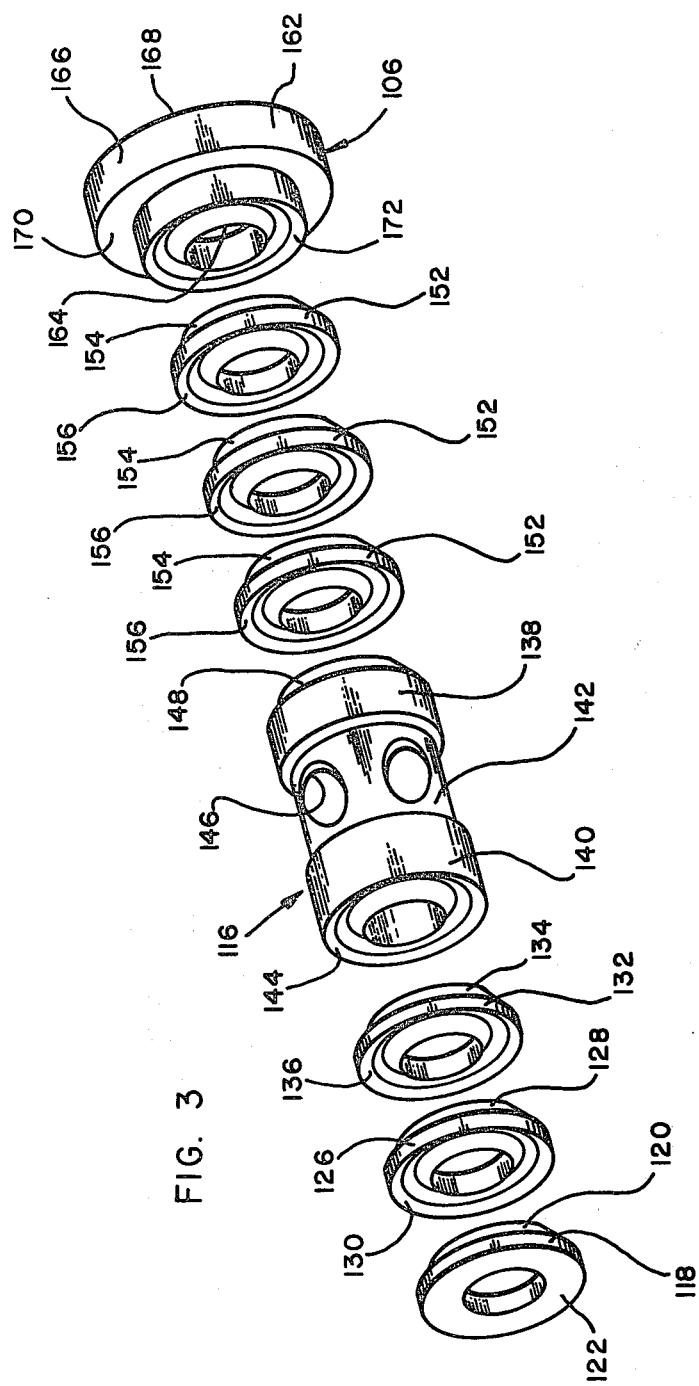
FIG. 3 is an exploded view of the packing arrangement illustrated in FIG. 2.

As best seen in FIGS. 2 and 3, stem packing arrangement 104 is generally comprised of a low temperature packing assembly generally designated as 112, a high temperature packing assembly generally designated 114, and a spacer ring 116 which separates the high and low temperature packing assemblies. Low temperature packing assembly 112 includes a lower adapter ring 118. The adapter ring 118 is made of an elastomeric material, and has a V-shaped upper surface 120 and a flat lower surface 122 which rests on inner annular shoulder 62. A first V-type seal or packing ring 126 is also made of an elastomeric material. "Viton" asbestos is one such material which is suitable. The packing ring 126 is provided with an upper V-shaped face 128 and a lower V-shaped recess 130 and is positioned axially outward of lower adapter ring 118, i.e., it is further from the flow passage than adapter ring 118, so that V-shaped recess 130 fits upon V-shaped upper surface 120 of lower adapter ring 118. A second V-type seal or packing ring 132 also made of similar elastomeric material and having an upper V-shaped face 134 and a lower V-shaped recess 136 is positioned axially outward of first packing ring 126 so that V-shaped recess 136 fits upon V-shaped face 128. Lower adapter ring 118, and first and second packing rings 126 and 132 together comprise the low temperature packing assembly 112. It is to be understood that a greater or lesser number of packing rings, such as rings 126, 132, can be used depending on the pressures expected.

Spacer ring 116 which is made of steel, such as 4140 alloy steel or stainless steel, has upper and lower enlarged diameter portions 138 and 140 at the opposite ends thereof joined by a mediate reduced diameter portion 142 which is formed by an external annular recess 143 in the outer wall of the spacer ring. Lower ring portion 140 has a V-shaped recess 144 in the free end thereof which faces downward and rests upon upper V-shaped face 134 of second packing ring 132. Upper ring portion 138 has a V-shaped upper face 148 at the free end thereof. Mediate portion 142 has a plurality of radial apertures 146 which extend radially inward from the external annular recess 143 to an internal annular recess 145 which communicates with the central opening through the spacer ring. The radial aperture 146 provides communication between valve stem 72 and fitting port 64 which is axially aligned with one of the radial apertures.

The high temperature packing assembly 114 is comprised of a trio of identical high temperature sealing or packing rings 152 each having a V-shaped face 154 on the upper face thereof and a V-shaped recess 156 in the bottom face thereof. High temperature packing rings 152, which could be more or less than three in number depending on the properties required for expected operating conditions, are fitted together so as to form a stack with the V-shaped recess 156 of the bottommost ring 152 resting on V-shaped face 148 of upper enlarged diameter portion 138 of spacer ring 116. Each high temperature packing ring 152 is a laminated structure of graphite sheets and a metallic mesh sheet. Further details of this laminated ring structure will be discussed hereinafter.

As best seen in FIG. 3, upper packing steel retainer 106 has an annular body 162 with a central aperture 164 therein through which valve stem 72 passes. A flange 166 extends radially outward of body 162 and defines top and bottom flange surfaces, 168 and 170, respectively. The bottom of body 162 has an annular V-shaped recess 172 therein. Upper packing retainer 106 is positioned so that its bottom flange surface 170 rests on the annular shoulder 58 in the bonnet bore 42 and V-shaped recess 172 rests on V-shaped face 154 of the uppermost high temperature packing ring 152.

Each high temperature packing ring 152 is a laminated structure formed from a plurality of flexible graphite sheets 174 and a metallic mesh sheet of interwoven stainless steel wire 176. The metallic mesh sheet 176 is contained between the graphite sheets 174 and acts to reinforce the high temperature packing ring 152 and give the ring lip strength. The number of graphite sheets 174 and the specific weave and gauge of wire of the metallic mesh sheet may vary depending upon the specific properties desired, such as lip strength.

Prior to operation, the stem packing arrangement 104 must be energized in order to effect an adequate seal between the bonnet and valve stem 72. Accordingly, an injectible graphite packing material 200 is injected under high pressure, e.g. 4,000 psi, into the stem packing arrangement 104 through port 64 by means of fitting 102 to energize both high and low temperature packing assemblies 114 and 112. U.S. Pat. No. 4,162,078 issued on July 24, 1979 to Cox shows an injectible graphite packing that would provide adequate performance characteristics if utilized with applicant's invention. When energized, the lips of the first and second elastomeric packing rings 126 and 132 and the lips of the high temperature packing rings 152 radially expand to sealingly engage the valve stem 72 and the wall of the intermediate diameter portion 56 of the bonnet bore. The graphite packing in annular recess 145 effects an annular seal about the valve stem 72 and the graphite packing in the external recess 143 effects an annular seal with the wall of the bore portion 56.

In operation within a normal temperature range of between approximately $-50°$ F. ($-46°$ C.) and 250° F. (121° C.) for the valve body, and with the fitting 102 installed in the port 64, both low temperature packing assembly 112 and high temperature packing assembly 114 effect a seal between valve stem 72 and the bonnet bore. In the event the temperature within valve chamber 50 rises above 250° F. (121° C.) the sealing effectiveness of low temperature packing assembly 112 decreases since elastomeric packing rings 126 and 132 begin to soften above 250° F. (121° C.) and cannot withstand temperatures above approximately 300° F. (149° C.). However, the high temperature packing assembly 114 with its high temperature packing rings 152 maintains its sealing effectiveness through very high temperatures far in excess of 1000° F. (538° C.). The graphite composition of high temperature packing rings 152 provides adequate high temperature sealing characteristics, and the metallic mesh sheet 176 provides sufficient rigidity so that high temperature packing rings 152 maintain their shape. The injectible graphite packing 200 provides secondary sealing and lubricating characteristics at both normal and high operating temperatures. The greater durability and memory of the elastomeric low temperature packing assembly 112 makes it more desirable as a low temperature packing than the laminated graphite and metallic structure of high temperature packing assembly 114.

It is to be noted that it is important to the successful operation of the stem packing arrangement that the low temperature packing assembly be positioned axially inward of the high temperature packing assembly with respect to the flow passages 18,20, that is, closer to the valve chamber and the flow passage. Since the low temperature packing assembly decomposes when it reaches a temperature somewhat above the expected normal operating temperature, the pressure from the valve chamber then acts on the spacer ring so that the high temperature packing assembly remains in an operable position and is in fact held in this operable position by the pressure from the valve chamber. If the high temperature packing assembly was positioned axially inward of the low temperature packing assembly, upon the low temperature packing assembly reaching its decomposition temperature it would decompose, and the high temperature packing assembly would be left unsupported against the pressure from the valve chamber. The probable result would be that the pressure from the valve chamber would distort the high pressure packing to such a degree that it would not provide effective sealing properties.

It will therefore be seen that a new and improved packing structure is disclosed herein which is particularly adapted as a "fire-safe" packing for sealing between a valve stem and valve housing at both low temperature normal operating conditions and also at abnormal high temperature conditions as might result from a fire. While the invention has been illustrated with respect to a non-rising stem valve wherein the valve stem is limited to only rotary movement about its axis, the unique packing structure of the invention also has applicability to rising stem valves wherein the valve stem is subjected to longitudinal movement for opening or closing the valve.

It is also to be understood that the foregoing description of the invention has been presented for purposes of illustration and explanation and is not intended to limit the invention to the precise form disclosed as changes in details of the illustrated construction may be made by those skilled in the art, within the scope of the appended claims, without departing from the spirit of the invention.

What is claimed is:

1. A packing structure for a valve stem extending through a packing chamber in a valve housing having a flow passage therethrough wherein said packing chamber is provided with packing stops at the ends thereof, one of said packing stops being an inner packing stop located nearest to the flow passage of the valve and exposed to the fluid pressure of the flow passage of the valve, and the other packing stop being an outer packing stop located outward of the inner packing stop with respect to the flow passage, said packing structure comprising:

a low temperature packing assembly positioned within the packing chamber between the valve stem and valve housing in surrounding relation to said valve stem and resting on said inner packing stop, said low temperature packing assembly being in sealing contact with the stem and valve housing at normal temperature conditions of the valve housing;

a rigid spacer member received about the valve stem and positioned within the packing chamber outwardly of said low temperature packing assembly and in engagement therewith; and a high temperature packing assembly positioned within the packing chamber between the valve stem and valve housing in surrounding relation to said valve stem and located outwardly of said spacer member so as to be sandwiched between said outer packing stop and said spacer member, said high temperature packing assembly being in sealing contact with the valve stem and valve housing at normal temperature conditions of the valve housing and at abnormally high temperature conditions of the valve housing which are destructive to said low temperature packing assembly so that the packing structure will not leak flow passage fluid when subjected to abnormally high temperatures.

2. The packing structure of claim 1 wherein said low temperature packing assembly is comprised of layers of elastomeric material.

3. The packing structure of claim 2 wherein said high temperature packing assembly is comprised of a plurality of packing rings in stacked relationship to one another, each said packing ring being a laminated structure formed from a plurality of graphite sheets and a sheet of metallic mesh.

4. The packing structure of claim 3 wherein said elastomeric material in the low temperature packing assembly has a decomposition temperature of approximately 300° F. (149° C.).

5. The packing structure of claim 1 wherein said spacer member is a metallic lantern ring provided with an inner annular recess adjacent said valve stem and an external annular recess disposed radially thereof to define a reduced thickness portion of said spacer member, said reduced thickness portion having one or more radial apertures providing communication between said inner and outer annular recesses; and a fitting mounted in communication with said annular recesses for injection of graphite packing material to energize and lubricate both said low and high temperature packing assemblies and provide secondary sealing in the regions of said inner and outer annular recesses with said valve stem and valve housing respectively.

6. The packing structure as recited in claim 5 wherein said low temperature packing assembly is comprised of a plurality of V-shaped layers of elastomeric material in stacked, nested relation to one another.

7. The packing structure as recited in claim 6 wherein said high temperature packing assembly comprises a plurality of V-shaped packing rings in stacked, nested relationship with one another, each said packing ring being a laminated structure formed of a plurality of graphite sheets and a sheet of metallic mesh.

8. A packing structure as recited in claim 7 wherein said low temperature packing assembly is of an elastomeric material having a decomposition temperature of approximately 300° F. (149° C.) and said low temperature packing assembly provides effective sealing at temperatures below said decomposition temperature.

9. A packing structure for a valve stem which extends through a packing chamber formed in the valve stem bore of a valve housing having a flow passage therethrough wherein said packing chamber is provided with packing stops at the ends thereof, one of said packing stops being an inner packing stop exposed to the fluid pressure of the flow passage, and the other packing stop being an outer packing stop located outwardly of the inner packing stop with respect to the flow passage, said packing structure comprising:

a low temperature packing assembly positioned within the packing chamber between the valve stem and the chamber wall in surrounding relation to said valve stem and in engagement with said inner packing stop;

a rigid spacer ring received about the valve stem and positioned within the packing chamber outwardly of said low temperature packing assembly and in engagement therewith, said spacer ring having an inner annular recess in its inner peripheral surface and an outer annular recess in its external peripheral surface and one or more radial apertures intercommunicating with said recesses;

a high temperature packing assembly positioned within the packing chamber between the valve stem and the wall of the packing chamber in surrounding relation to the valve stem and located outwardly of said spacer ring so as to be sandwiched between said outer packing stop and said spacer ring; and a fitting mounted in communication with the annular recesses in said spacer ring for injection of graphite packing material to energize and lubricate said low and high temperature packing assemblies, said low temperature packing assembly being energized in sealing contact with the valve stem and chamber wall at normal temperature conditions below the decomposition temperature of the low temperature packing, and said high temperature packing assembly being energized in sealing contact with the valve stem and chamber wall to provide a sealing relationship therewith at abnormally high temperature conditions which impair the stem sealing relationship of the low temperature packing assembly so that the packing structure will not leak flow passage fluid when subjected to abnormally high temperatures and pressures.

10. A packing structure as recited in claim 9 wherein said low temperature packing assembly includes a plurality of V-shaped rings of elastomeric material disposed in a stacked, nested relationship and an adapter ring of elastomeric material engaged with said inner packing stop and provided with a V-shaped surface disposed in nested engagement with one of said V-shaped rings.

11. The packing structure of claim 10 wherein said high temperature packing assembly is comprised of a plurality of V-shaped packing rings in stacked, nested relationship, each said packing ring being a lamination of sheets of graphite material and metallic mesh, said spacer ring having annular V-shaped surfaces disposed respectively in nested engagement with V-shaped surfaces of said low temperature packing assembly and said high temperature packing assembly.

12. The packing structure of claim 9 wherein said inner packing stop is an annular shoulder formed in the valve stem bore by an enlarged diameter portion thereof and said outer packing stop is an annular retainer member fixed within said valve stem bore.

* * * * *